United States Patent [19]

Kohashi et al.

[11] Patent Number: 4,709,770
[45] Date of Patent: Dec. 1, 1987

[54] DEVICE FOR CORRECTING DYNAMIC WEIGHT SIGNAL FROM CONVEYER WEIGHER

[75] Inventors: Toru Kohashi; Motoyuki Adachi, both of Hyogo, Japan

[73] Assignee: Yamato Scale Company, Limited, Akashi, Japan

[21] Appl. No.: 937,105

[22] Filed: Dec. 2, 1986

[30] Foreign Application Priority Data

Dec. 5, 1985 [JP] Japan .................. 60-274797

[51] Int. Cl.$^4$ .................. G01G 19/52; G01G 23/10
[52] U.S. Cl. .................. 177/50; 177/25; 177/185
[58] Field of Search .................. 177/25.14, 50, 185

[56] References Cited

U.S. PATENT DOCUMENTS 3,643,753 2/1972 Godwin et al. .................. 177/185
4,231,439 11/1980 Hall, Jr. et al. .................. 177/185 X
4,413,739 11/1983 Kohashi .................. 177/50 X

FOREIGN PATENT DOCUMENTS

3318409 11/1984 Fed. Rep. of Germany ...... 177/185
168867 12/1981 Japan .

Primary Examiner—George H. Miller, Jr.
Attorney, Agent, or Firm—Senniger, Powers, Leavitt and Roedel

[57] ABSTRACT

A device used with a conveyer weigher for automatically correcting dynamic weight signals indicative of the weights of articles successively fed to the weighing conveyer of the weigher at constant intervals, wherein the weight signal of each article is influenced by the "aftereffect" of that of the preceding article, which can automatically change the rate of correction when any article drops out from a regular interval feed line, thereby obtaining the true static weight of each article at any time.

6 Claims, 10 Drawing Figures

DEVICE FOR CORRECTING DYNAMIC WEIGHT SIGNAL FROM CONVEYER WEIGHER

BACKGROUND OF THE INVENTION

This invention relates to a device used with a conveyer weigher for correcting a dynamic weight signal indicative of the weight of an article provided from the weigher while it is loaded with the article. The invention is used to approximate the weight of the article in its stationary state by using the dynamic weight signal.

As well known in the art, the conveyer weigher is a weighing device having a moving belt or chain conveyer for weighing articles successively fed onto this conveyer under dynamic conditions. This weigher is used, for example, in a weight sorting machine.

Figure 1:
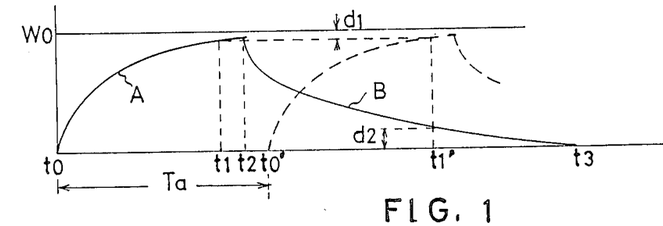
FIG. 1 is a diagram representing a typical weight signal waveform for explaining occurence of error in the dynamic weight signal.

As shown typically and illustratively in FIG. 1, the level of weight signal from the weigher rises along curve A when an article to be weighed is fed at time $T_0$ to the loading end of the weighing conveyer of such weigher. While this level approaches gradually to a specific level $W_0$ indicative of the static weight of the article, it is a general practice to pick up or sense the weight signal at time $t_1$ before it arrives at the level $W_0$ and to unload the article a short time after at time $t_2$. Accordingly, there is an error $d_1$, as shown, to be corrected with respect to the static weight $W_0$.

After the unloading time $t_2$, the weight signal level decays along curve B and returns to zero at time $t_3$. It is also a general practice to load the weighing conveyer with a second article at time $t_0'$ which is just after the unloading time $t_2$. The weight signal is picked up or sensed at time $t_1'$, well before time $t_3$, in order to improve weighing efficiency by reducing the article feeding interval Ta. Accordingly, the weight signal of the second article is influenced by the decaying weight signal B of the first article which adds another error $d_2$, as shown, when it is picked up at time $t_1'$ and thus the deviation of the dynamic level from the static level $W_0$ is $d_2 - d_1$.

Some devices for correcting this deviation have been proposed already as disclosed, for example, in the opened Japanese patent specification No. 56-168867 and U.S. Pat. No. 4,413,739. In these devices, a test article is weighed first on the weighing conveyer in its stationary state and the test article is repeatedly weighed on the weighing conveyer in its moving state and the resultant dynamic weight signals are averaged. The average deviation of the dynamic weight signal from the static weight signal is calculated and stored in memory and, in the actual weighing operation, the content of the memory is added to or subtracted from the dynamic weight signal of each article weighed by the weigher for cancelling the above deviation. Such prior art correction systems are based upon a principle that there should be very little error if the weight of the test article is close to that of the actual article to be weighed.

As understood from FIG. 1, the error $d_2$ varies with time $t_1'$, that is, with variation of the feeding interval Ta. The prior art correction devices cannot function satisfactorily when the feeding interval Ta varies as, for example, where one or more articles have dropped out from a regular interval line of articles, which may frequently occur in a general production line; the prior art is satisfactory if Ta is maintained constant.

Accordingly, an object of this invention is to provide an improved device which can correct any error induced in the dynamic weight signals, not only when the feeding interval Ta is kept constant, but also when it is subject to changes.

SUMMARY OF THE INVENTION

In accordance with this invention, a device is provided including arithmetic means similar to that in the prior art devices for correcting a dynamic weight signal supplied from a conveyer weigher through a filter for removing its vibration component, with a correction constant stored previously in memory means, as in the case of prior art devices. According to a feature of this invention the memory means comprises first and second memories for storing first and second correction constants, respectively, and the device further includes an article detector for detecting articles loaded on the weighing conveyer of the weigher to provide detection signals and selection means responsive to the detection signals to count the interval between the adjoining detection signals for causing the first memory to apply its content to the arithmetic means when the counted interval is less than a predetermined value and causing the second memory to apply its content to the arithmetic means when the counted interval is greater than the predetermined value.

These and other features and operation of this invention will be best understood by reading the following description with reference to the accompanying drawings.

DESCRIPTION OF A PREFERRED EMBODIMENT

Figure 2:
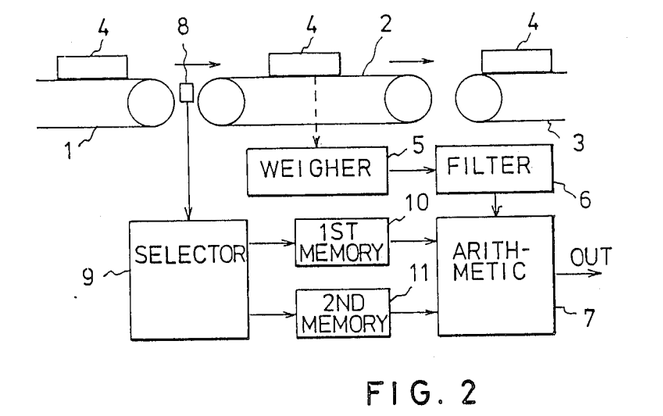
FIG. 2 is a schematic block diagram representing a conceptional arrangement of the device according to this invention.

Referring to FIG. 2, a conveyer weigher includes loading, weighing and unloading conveyers 1, 2 and 3 arranged in line for conveying articles 4 to be weighed at a constant interval to the arrow direction. When each article 4 comes on the weighing conveyer 2, its weight is sensed by a weighing unit 5, such as a load cell, at time $t_1$ (FIG. 1) and a corresponding weight (indicative) signal is applied through a filter 6 to an arithmetic unit 7. The filter 6 serves to remove vibration components from the weight signal. An article detector 9 is disposed between the loading and weighing conveyers 1 and 2 for detecting passage of the article 4 to provide a detection signal to a selector unit 9. The selector unit 9 is arranged to measure the time interval between the consecutive detection signals and provide an output signal to a first memory 10 when the measured interval is less than a predetermined value and to a second memory 11 when the measured interval is greater than the predetermined value. The memories 10 and 11 respond to the output signal from the selector unit 9 to apply their content which are first and second correction constants to the arithmetic unit 7. The arithmetic unit 7 adds the selected correction constant to the input weight signal (from filter 6) to correct it. The above-mentioned predetermined value and correction constants are available as described below in conjunction with a preferred embodiment as shown in FIG. 3.

Figure 3:
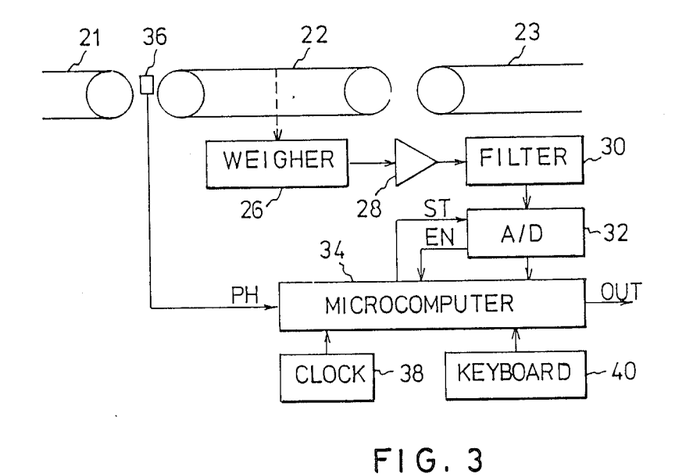
FIG. 3 is a block diagram representing an embodiment of the device of this invention.
Figure 4:
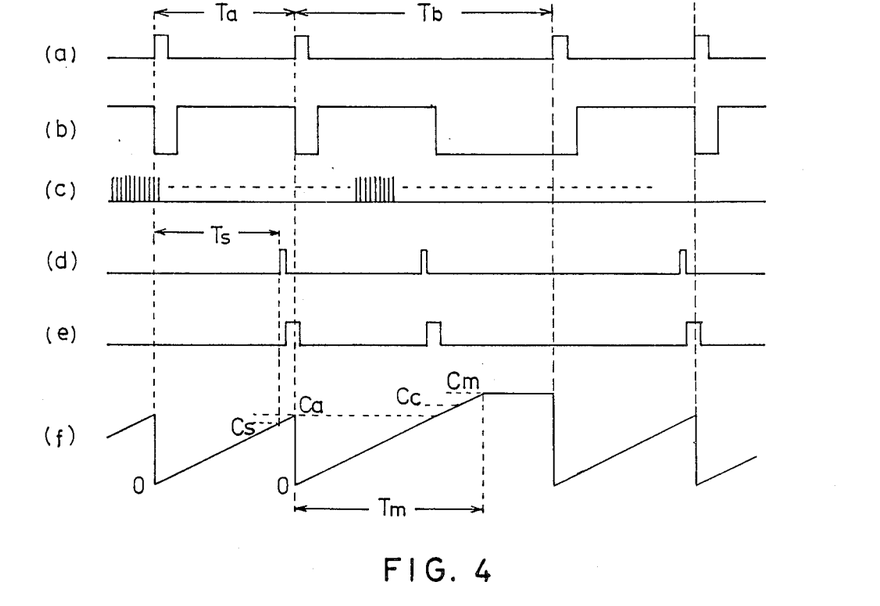
FIG. 4 is a waveform diagram for explaining operation of the embodiment of FIG. 3.

The device of FIG. 3 includes loading, weighing and unloading conveyers 21, 22 and 23 corresponding respectively to 1, 2 and 3 of FIG. 2 and analog output weight signal from a weighing unit 26, such as load cell, is amplified by an amplifier 28, filtered by a filter 30 similar to filter 6 of FIG. 2 and applied to an analog-to-digital (A/D) converter 32 which converts the analog weight signal into a corresponding digital signal for supplying it to a microcomputer 34. A photoelectric article detector 36 corresponding to detector 8 of FIG. 2 serves to detect each article just before it is loaded on the weighing conveyer 22 to provide a detection signal PH as shown in FIG. 4(a) to the microcomputer 34. The square waveform of FIG. 4(b) shows the timing of loading and unloading of the weighing conveyer 22 with successive or consecutive articles and the leading and trailing edges correspond respectively to the time points $t_0$ and $t_2$ of FIG. 1.

A clock pulse generator 38 produces a clock pulse train as shown in FIG. 4(c) and supplies the pulse train to the microcomputer 34. The microcomputer 34 includes a counter responsive to the leading edge of the detection signal PH (FIG. 4(a)) for starting a count of the clock pulses and providing a conversion start signal ST (FIG. 4(d)) to the A/D convertor 32 at time $t_1$ of FIG. 1 when it reaches a predetermined count corresponding to a time period Ts. The A/D convertor 34 is arranged to respond to the signal ST to provide a digital weight signal to the computer 34 and, upon completion of this conversion, to provide a conversion end signal EN as shown in FIG. 4(e) to the computer 34. The microcomputer 34 also includes a C-counter responsive to the leading edge of detection signal PH for starting to count the clock pulses. The C-counter is arranged to increment its count C as shown in FIG. 4(f) and to be reset to zero in response to the leading edge of the next PH signal when it appears after the predetermined time interval Ta. When no PH signal appears within the time interval Ta, the C-counter stops to count after a specific time interval Tm and maintains the corresponding count Cm until it is reset to zero by the next PH signal. The count limit Cm is selected to avoid overflow of the C-counter and the corresponding time interval Tm is embodiment. The microcomputer 34 is also provided with a selected to be greater than Ta but less than 2Ta for this keyboard input device 40 for setting its mode of operation.

The operation of this device will now be described below with reference to the flow charts of FIGS. 5 to 8. In order to calculate the correction constants, static and dynamic weight signals are read separately from the A/D convertor 32 into the computer 34. For this purpose, the keyboard 40 has STATIC and DYNAMIC keys for specifying static and dynamic weight reading programs, respectively. The STATIC key interlocks with the weighing conveyer 22 to stop the conveyer when it is pushed. The keyboard 40 also includes START and END keys for starting and finishing the operation, respectively.

Figure 5:
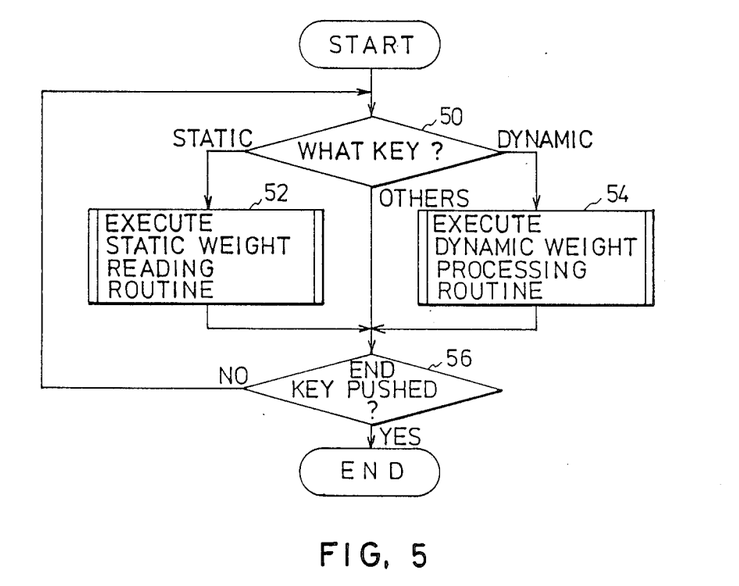
FIG. 5 is a flow chart representing a main program of the operation of the embodiment of FIG. 3.

When START key is pushed, it is first inquired, in step 50 of the main program of FIG. 5, what key is pushed. If the STATIC key is pushed, a static weight reading routine is executed in step 52 and, if the DYNAMIC key is pushed, a dynamic weight processing routine is executed in step 54. Thereafter, it is inquired in step 56 whether END key is pushed or not. If YES, the program is ended and, if NO, the same steps are repeated.

Figure 6:
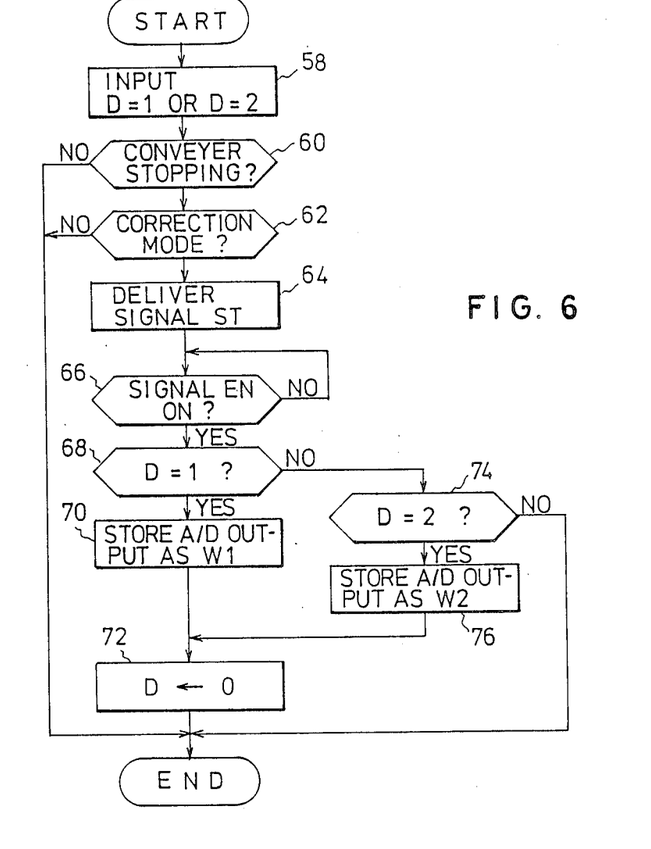
FIG. 6 is a flow chart representing a static weight reading routine in the flow chart of FIG. 5.

The static weight reading routine is shown in detail in FIG. 6. In this routine, the CORRECTION mode key is pushed and first and second test articles, which are similar to the actual articles to be weighed, are separately put on the stationary weighing conveyer 22. At the same time, a decimal key D of "1" is pushed when the first test article is applied and a decimal key D of "2" is pushed when the second test article is applied, in step 58. Then, it is inquired in step 60 whether the weighing conveyer is at a stop or not and, if YES, it is inquired in step 62 whether CORRECTION mode key is pushed or not. If YES, a conversion start signal ST is applied to the A/D convertor 32 to start reading of the digital weight signal into the microcomputer 34. If the next step 66, it is inquired repeatedly whether the conversion end signal EN is provided from the A/D convertor 32 or not. When the answer becomes YES, it is further inquired in step 68 whether the pushed D key is "1" or not and, if YES, the current output weight signal is stored in a memory as the static weight W1 of the first test article in step 70 and the D key is reset in step 72. If the answer of step 68 is NO, it is inquired in step 74 whether the pushed D key is "2" or not. If YES, the current output weight signal of A/D convertor 32 is stored in the memory as the static weight W2 of the second test article in step 76 and D key is reset in step 72. If the answer of step 60, 62 or 74 is NO, it is necessary to interrupt the operation and check the system.

When the static weight reading routine is completed, the dynamic weight processing routine for reading dynamic weights of the first and second test articles and calculating the correction constants is executed. This routine is shown in detail in FIG. 7. In case of executing this routine, DYNAMIC key is pushed instead of STATIC key to move the weighing conveyer 22 and, in addition, TEST mode switch is pushed. Then, an operation of loading the weighing conveyer with the first and second test articles is repeated a predetermined number of times in such fashion that the first test article is loaded provided there is no preceding article within a predetermined time interval Ta and the second test article is loaded at a time interval of Ta after the first test article. After repeating this operation, COMPUTATION command key is pushed during this routine.

Figure 8:
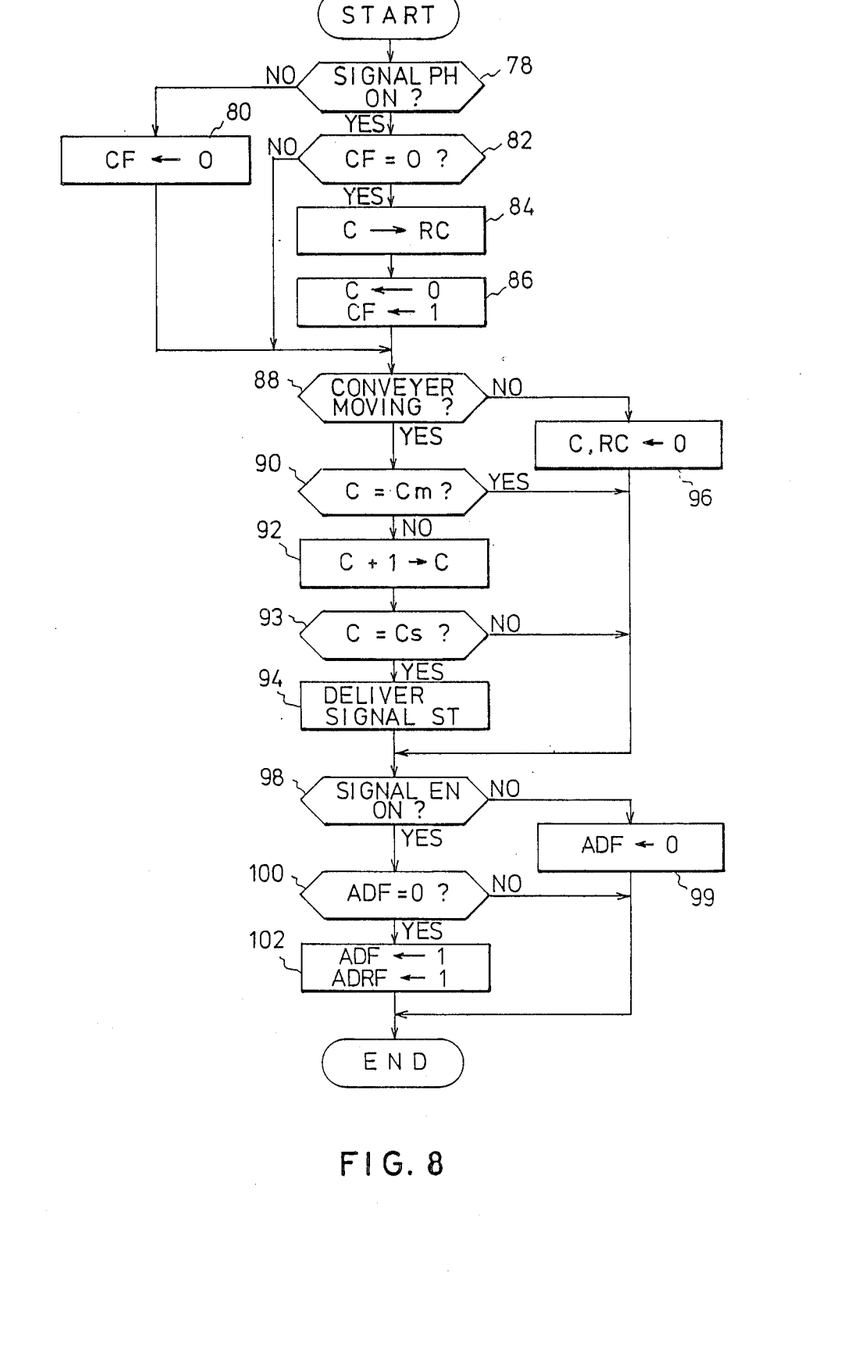
FIG. 8 is a flow chart representing an interrupt routine for the dynamic weight processing routine of FIG. 7.

During execution of the dynamic weight processing routine, an interrupt routine as shown in FIG. 8 is executed in response to the clock pulse for checking the article feeding interval. For convenience of explanation, the interrupt routine will be described first.

In the interrupt routine, as shown in FIG. 8, it is first inquired in step 78 whether the optical detector 38 is providing a detection signal PH or not, that is, whether any article has been detected or not. If NO, a count flag CF is made "0" in step 80 and, if YES, it is inquired in step 82 whether the CF flag is "0" or not. If YES, the count C of aforementioned C-counter is stored in a memory location RC in step 84. As shown in FIG. 4(f), this count C is equal to Ca corresponding to the time interval Ta, if the article was fed at the interval Ta with respect to the preceding article. However, it will be incremented beyond Ca towards Cm if the preceding article is not within the time Ta. Then, the count C is reset to zero and the CF flag is made "1" in step 86.

Thereafter, and also when the answer of step 78 or 82 is NO, it is inquired in step 88 whether the weighing conveyer 22 is moving or not. If YES, it is further inquired whether the count C has reached Cm which means the time interval is about to exceed the aforementioned Tm in step 90 and, if the answer is NO, the count C is incremented by one in step 92. In the next step 93, it is inquired whether the count C is equal to Cs corresponding to the time interval Ts as shown in FIG. 4(d), or not. If the answer is YES, a conversion start signal signal ST is applied to the A/D convertor 32 to read its output in step 94. If the answer of step 88 is NO, the count C and the content of memory location RC are reset to zero.

After step 94 or 96, and also when the answer of step 90 is YES or the answer of step 93 is NO, it is inquired in step 98 whether the A/D convertor 32 is providing a conversion end signal EN or not and, if NO, an A/D end flag ADF is made "0" in step 99 to end this routine. If the answer of step 98 is YES, it is further inquired in step 100 whether the ADF flag is "0" or not and, if NO, this routine is ended but, if YES, the ADF flag and an A/D read flag ADRF are made "1" to end the routine.

Figure 7:
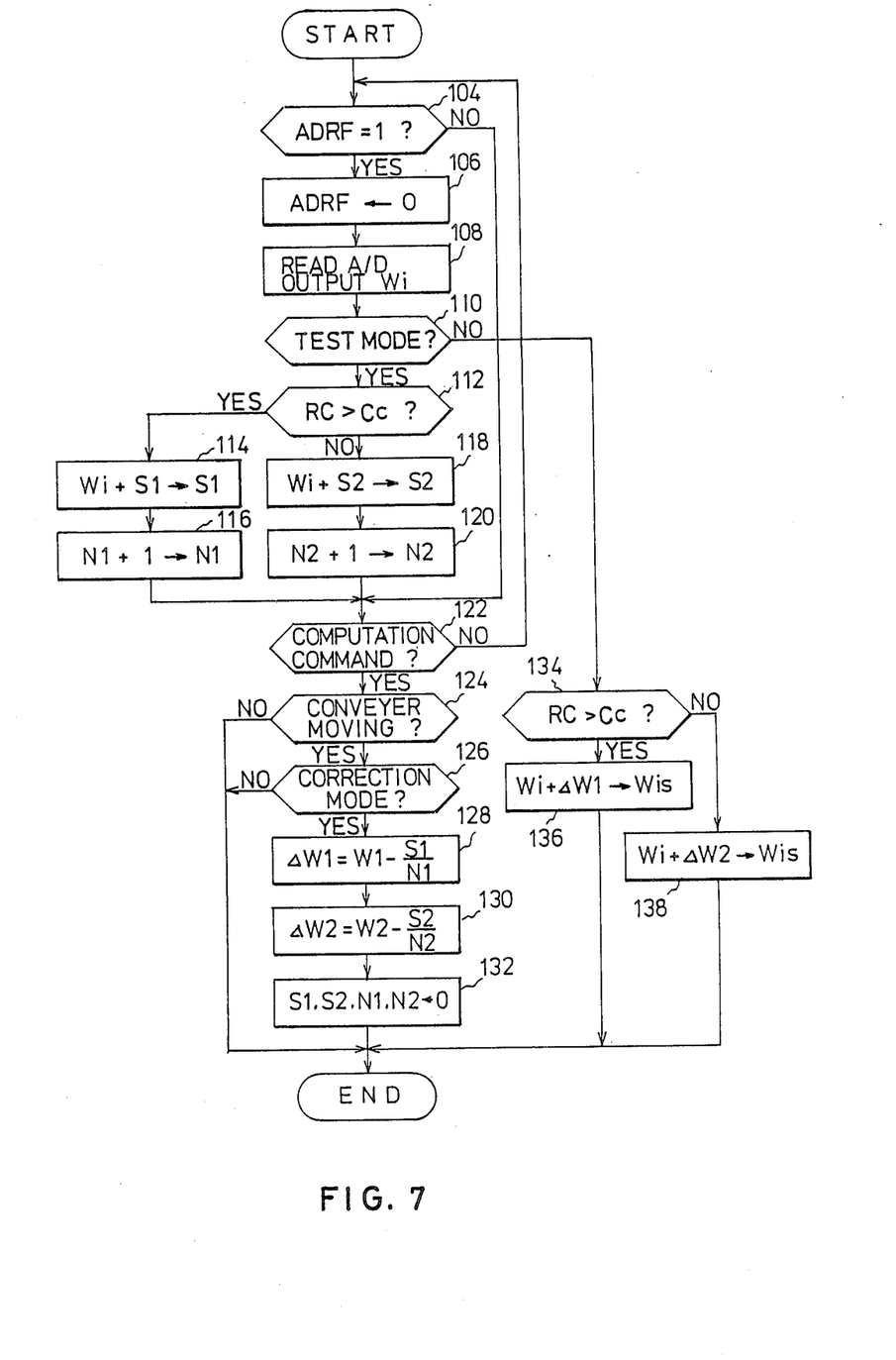
FIG. 7 is a flow chart representing a dynamic weight processing routine in the flow chart of FIG. 5.

In the dynamic weight processing routine of FIG. 7, it is first inquired in step 104 whether the ADRF is "1" or not and, if YES, this flag ADRF is made "0" in step 106 and the current output Wi of A/D convertor 32 is read in step 108. Then, it is inquired in step 110 whether the TEST mode key is pushed or not. In the case of calculating the correction constants, this key has already been pushed as aforementioned. Therefore, the answer is YES and it is further inquired in step 112 whether the content of the RC memory is greater than a predetermined value Cc or not. The value Cc is selected in this embodiment to be between the counts Ca and Cm as shown in FIG. 4(f). Accordingly, the current article should be the first test article if the answer of step 112 is YES and it should be the second test article if the answer is NO. When the answer is YES, the current output Wi of A/D convertor 32 is accumulated in a memory location S1 in step 114 and an associated N1-counter is incremented by one in step 116. However, if the answer of step 112 is NO, the output Wi is accumulated in a memory location S2 in step 118 and an associated N2-counter is incremented by one in step 120.

In the next step 122, it is inquired whether COMPUTATION command key is pushed or not and, if NO, the program is returned to step 104 to repeat the same operation for accumulating the dynamic weight signals of the first and second test articles in the memory locations S1 and S2, respectively, and counting the numbers N1 and N2 of respective accumulated signals.

When COMPUTATION key is pushed as aforementioned, it is inquired in step 124 whether the weighing conveyer is moving or not. If YES, it is further inquired whether CORRECTION mode key is pushed or not in step 126. If YES, a first correction constant W1 is calculated by subtracting the current average dynamic weight S1/N1 of the first test article from its static weight W1 in step 128 and a second correction constant W2 is calculated by subtracting the similar average weight S2/N2 of the second test article from its static weight W2 in step 130. Thereafter, the accumulated contents S1, S2, N1 and N2 are all reset to zero in step 132 to complete this preliminary operation for inputting proper correction constants. If the answer of step 124 or 126 is NO, the operation is interrupted to check the system.

When the above test mode of operation is completed and an actual weighing process is to be started, TEST mode key is reset. Thus, the answer of step 110 becomes NO and it is inquired in step 134 whether the content of RC location is greater than Cc or not, that is, a predetermined time has passed after the preceding article or not. If the answer is YES, the first correction constant W1 is added to the current weight Wi to obtain a corresponding static weight Wis in step 136 and, if the answer is NO, the second correction constant W2 is added to obtain a corresponding static weight in step 138.

Figure 9A:
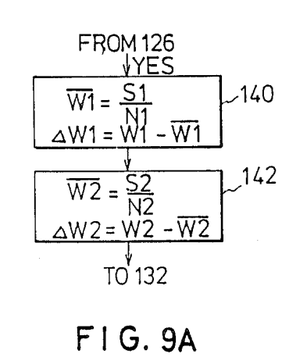
FIGS. 9A and 9B are flow charts representing variations of a part of the flow chart of FIG. 7.
Figure 9B:
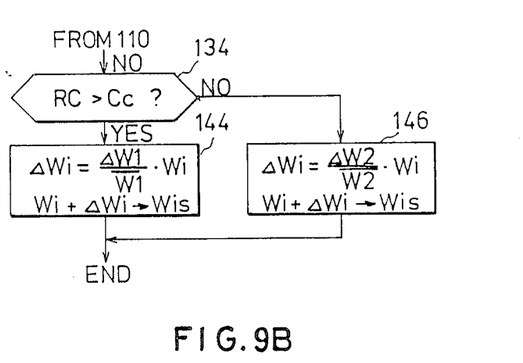

When the actual articles to be weighed exhibit large variances in their weights, it is recommended that a modified proportional correction according to the routine of FIG. 7 in which steps 128 and 130 be substituted with steps 140 and 142 of FIG. 9A and steps 136 and 138 be substituted with steps 144 and 146 of FIG. 9B, respectively. In the modified routine, the average weights $\overline{W1}$ and $\overline{W2}$ are stored and used for the proportional correction in steps 144 and 146.

While the dynamic weight of article was corrected in the above embodiment, similar correction can also be applied to a deviation signal produced in the conveyer weigher. For example, in a weight sorting machine the deviation signal is a difference between the dynamic weight signal and a predetermined reference or standard weight signal.

What is claimed is:

1. A device for correcting dynamic weight signals provided by a conveyer weigher through a filter for removing the vibration components of said signals to obtain corresponding static weight signals, including first memory means for storing a first correction constant and arithmetic means for applying a correction computation to said dynamic weight signals based upon said first correction constant; characterized by said device further including second memory means for storing a second correction constant, means for detecting each article fed to said weigher to produce a detection signal, and selection means responsive to said detection signals for measuring the time interval between adjoining articles fed to said weigher to apply the content of said first memory to said arithmetic means when the measured value is less than a predetermined value and to apply the content of said second memory means to said arithmetic means when the measured value is greater than said predetermined value.

2. A device, as set forth in claim 1, characterized in that said predetermined value is greater than a predetermined regular feeding interval but less than twice said regular interval.

3. A device for correcting dynamic weight signals from a conveyer weigher, comprising:
   means for filtering the dynamic weight signals to remove vibration components therefrom;
   means for detecting the feeding of an article to the conveyor to produce a detection signal; and means for storing first and second correction constants, for measuring the time interval between two consecutive detection signals corresponding to first and second successive articles fed to the conveyor, for reading a filtered dynamic weight signal corresponding to said second article, and for applying the first correction constant to said filtered dynamic weight signal corresponding to said second article when the time interval is less than a predetermined value or the second correction constant to said filtered dynamic weight signal corresponding to said second article when the time interval is greater than said predetermined value, thereby to produce a corrected weight signal indicative of the static weight of said second article.

4. A device as set forth in claim 3 wherein the conveyor includes means for feeding articles to the conveyor with a predetermined time interval between successive articles, and wherein said storing and measuring means includes means for adjusting said predetermined value to a value which is greater than the predetermined interval but less than twice the predetermined interval.

5. A method of correcting dynamic weight signals from a conveyer weigher comprising the steps of:

filtering the dynamic weight signals to remove vibration components therefrom;

detecting the feeding of an article to the conveyor to produce a detection signal;

storing first and second correction constants;

measuring the time interval between two consecutive detection signals corresponding to first and second successive articles fed to the conveyor;

reading a filtered dynamic weight signal corresponding to said second article; and applying the first correction constant to said filtered dynamic weight signal corresponding to said second article when the time interval is less than a predetermined value or the second correction constant to said filtered dynamic weight signal corresponding to said second article when the time interval is greater than said predetermined value, thereby to produce a corrected weight signal indicative of the static weight of said second article.

6. A method as set forth in claim 5 wherein the conveyor includes means for feeding articles to the conveyor with a predetermined time interval between successive articles, and further including the step of adjusting said predetermined value to a value which is greater than the predetermfined interval but less than twice the predetermined interval.

* * * * *

UNITED STATES PATENT AND TRADEMARK OFFICE
CERTIFICATE OF CORRECTION

PATENT NO. : 4,709,770
DATED : December 1, 1987
INVENTOR(S) : Toru Kohashi and Motoyuki Adachi It is certified that error appears in the above—identified patent and that said Letters Patent is hereby corrected as shown below:

Column 1, line 17, "$T_0$" should read -- $t_0$ --. Column 2, line 66, "detector 9 is" should read -- detector 8 is --. Column 3, line 2, "between the con-" should read -- between con- --; Lines 58-59, "is embodiment" should read -- is selected to be greater than Ta but less than 2Ta for this embodiment --; Lines 59-60, delete -- selected to be greater than Ta but less than 2Ta for this --; Column 5, line 21, delete -- signal --.

Signed and Sealed this

Sixth Day of September, 1988

Attest:

DONALD J. QUIGG

Attesting Officer

Commissioner of Patents and Trademarks